United States Patent
Lacaille et al.

(10) Patent No.: US 10,115,245 B2
(45) Date of Patent: Oct. 30, 2018

(54) MONITORING OF AN AIRCRAFT ENGINE TO ANTICIPATE THE MAINTENANCE OPERATIONS

(71) Applicant: Snecma, Paris (FR)

(72) Inventors: Jérôme Henri Noël Lacaille, Rosny sous Bois (FR); Aurélie Gouby, Quincy-sous-Senart (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 158 days.

(21) Appl. No.: 15/028,267

(22) PCT Filed: Oct. 1, 2014

(86) PCT No.: PCT/FR2014/052485
§ 371 (c)(1),
(2) Date: Apr. 8, 2016

(87) PCT Pub. No.: WO2015/052408
PCT Pub. Date: Apr. 16, 2015

(65) Prior Publication Data
US 2016/0240017 A1    Aug. 18, 2016

(30) Foreign Application Priority Data

Oct. 11, 2013 (FR) ...................................... 13 59903

(51) Int. Cl.
| | |
|---|---|
| *G07C 5/00* | (2006.01) |
| *B64F 5/00* | (2017.01) |
| *G07C 5/08* | (2006.01) |
| *G05B 23/02* | (2006.01) |
| *B64F 5/60* | (2017.01) |
| *B64D 31/06* | (2006.01) |

(52) U.S. Cl.
CPC ................ *G07C 5/002* (2013.01); *B64F 5/60* (2017.01); *G05B 23/0232* (2013.01);
(Continued)

(58) Field of Classification Search
CPC ............ G05B 23/0232; G05B 23/0254; G05B 23/0283; G07C 5/002; G07C 5/008; G07C 5/0841; B64F 5/60; B64D 31/06
See application file for complete search history.

(56) References Cited

U.S. PATENT DOCUMENTS

| | | | | |
|---|---|---|---|---|
| 7,286,923 B2* | 10/2007 | Pomeroy | ................ | G01C 23/00 477/30 |
| 2007/0078585 A1* | 4/2007 | Pomeroy | ................ | G01C 23/00 701/100 |

(Continued)

FOREIGN PATENT DOCUMENTS

| | | |
|---|---|---|
| EP | 2376988 A1 | 10/2011 |
| FR | 2939928 A1 | 6/2010 |

(Continued)

OTHER PUBLICATIONS

U.S. Appl. No. 15/028,284, filed Apr. 8, 2016, which is a national stage application of PCT/FR2014/052556 (WO 2015/052438).

(Continued)

*Primary Examiner* — Jerrah Edwards
(74) *Attorney, Agent, or Firm* — Pearne & Gordon LLP (57) ABSTRACT

A method and a system for monitoring an aircraft engine (2), including: acquisition and processing part (11) configured to collect a time signal of the exhaust gas temperature residual margin of the aircraft engine (2), acquisition and processing part (11) configured to smooth the time signal thus forming a first curve representing the temperature residual margin, acquisition and processing part (11) configured to identify decreasing pieces in the first curve, acquisition and processing part (11) configured to construct a second curve by concatenation of the decreasing pieces, the second curve being continuous while being restricted to the decreasing pieces of the first curve, acquisition and processing part (11)
(Continued)

configured to construct a prediction model from the second curve to determine at least one failure forecast indicator.

10 Claims, 6 Drawing Sheets

(52) U.S. Cl.
CPC ..... *G05B 23/0254* (2013.01); *G05B 23/0283* (2013.01); *G07C 5/008* (2013.01); *G07C 5/0841* (2013.01); *B64D 31/06* (2013.01)

(56) References Cited

U.S. PATENT DOCUMENTS

| | | | |
|---|---|---|---|
| 2009/0048730 A1* | 2/2009 | Akkaram | G07C 5/006 701/31.4 |
| 2011/0307431 A1 | 12/2011 | Lacaille | |
| 2013/0204808 A1 | 8/2013 | Jiang et al. | |
| 2013/0211768 A1 | 8/2013 | Gerez et al. | |
| 2015/0106313 A1* | 4/2015 | Eklund | G06N 3/02 706/21 |
| 2015/0120214 A1 | 4/2015 | Gouby et al. | |
| 2015/0287249 A1 | 10/2015 | Lacaille et al. | |
| 2016/0103038 A1 | 4/2016 | Lacaille et al. | |

FOREIGN PATENT DOCUMENTS

| | | |
|---|---|---|
| WO | 8103079 A1 | 10/1981 |
| WO | 2008127539 A1 | 10/2008 |
| WO | 2010076468 A1 | 7/2010 |
| WO | 2015052438 A1 | 4/2015 |

OTHER PUBLICATIONS

French Search Report for FR 13 59903 dated Jul. 18, 2014.
International Search Report for PCT/FR2014/052485 dated Jan. 30, 2015.
Written Opinion for PCT/FR2014/052485 dated Jan. 30, 2015.

* cited by examiner

MONITORING OF AN AIRCRAFT ENGINE TO ANTICIPATE THE MAINTENANCE OPERATIONS

FIELD OF THE INVENTION

The present invention relates to the field of monitoring of an aircraft engine. In particular, the invention provides a method and a system for monitoring an aircraft engine to forecast the maintenance operations by estimating an exhaust gas temperature residual margin of the engine.

During each flight, an aircraft performs the recording and sending of information regarding its operation according to a message system referred to as ACARS (Aircraft Communication Addressing and Reporting System). These data are recovered by ground stations in real time to be immediately processed in case of obvious abnormalities and otherwise to be archived with all the data of the fleet.

Data related to the engine are then consulted by experts to monitor the proper operating of the engine. Amongst other things, the experts analyze the data regarding the exhaust gas temperature EGT from successive flights to diagnose the state of an engine and forecast the failures. In particular, the experts estimate the EGT temperature residual margin which represents the difference between a limit temperature threshold and the measured EGT temperature. Thus, it is important to monitor the evolution of this margin so as to be able to anticipate the exceeding of a threshold beyond which the engine must be removed to restore its performances.

It will be noticed that at the beginning of lifetime, the margin is high and gradually decreases with the number of cycles. Thus, the time signal of the temperature residual margin normally evolves along a downward-sloping curve representing the normal wear of the engine.

However, instead of continuously decreasing, the time signal of the margin which is usually observed has random oscillations. These oscillations are mainly due to the servicing operations carried out on the engine and, to a lesser extent, to the acquisition conditions of the temperature measurements. Artificial increases in the temperature residual margin can be caused by more or less frequent cleanings of the engines performed to eliminate the dirt built up from one flight to the other.

These oscillations of the time signal of the temperature residual margin complicate the analysis and do not enable the failure date of the engine to be predicted suitably in advance and accurately.

The object of the present invention is therefore to overcome the abovementioned drawbacks by providing a method and a system for monitoring the exhaust gas temperature residual margin of an aircraft engine enabling to forecast the failure of the engine to be forecast in a simple accurate way and sufficiently in advance.

OBJECT AND SUMMARY OF THE INVENTION

The present invention relates to a method for monitoring an aircraft engine, including the following steps:
  acquiring a time signal of the exhaust gas temperature residual margin of said aircraft engine,
  smoothing said time signal to form a first curve representing said temperature residual margin,
  identifying the decreasing pieces in said first curve,
  constructing a second curve by concatenation of said decreasing pieces, said second curve being continuous while being restricted to said decreasing pieces of said first curve, and
  constructing a prediction model from said second curve to determine at least one failure forecast indicator.

This method models in a quick simple way the real wear of the engine eliminating the artificial increases in the temperature margin and thus enabling the failure of the engine to be accurately forecast.

Advantageously, identifying the decreasing pieces in said first curve includes the following steps:
  applying to the first curve a statistical increase model decomposable into two independent parts formed of a first decreasing function representing a usual wear of the aircraft engine and of a second step function formed of randomly triggered hops representing ad hoc servicing operations on the aircraft engine,
  looking for ascents corresponding to said hops, and
  identifying the decreasing pieces by deleting the points from said ascents on the first curve.

This enables the artificial increases in the temperature margin to be eliminated to keep only the intervals corresponding to the decreasing pieces representing the wear of the engine.

Advantageously, constructing by concatenation said second curve includes a bonding of said decreasing pieces by displacing each previous piece to make it join to the following piece starting by the last piece and going back in time step by step.

This enables the decrease trend indicating the real wear of the engine to be modeled.

According to a first embodiment of the invention, constructing said prediction model includes the following steps:
  constructing an autoregressive model modeling the evolution of the temperature residual margin using the record of said second curve, and
  applying a dynamic filter to said autoregressive model to determine said at least one failure forecast indicator.

This construction of a dynamic model enables accurate forecasts to be made on any type of engine and at any period of the engine life.

Advantageously, the dynamic filter is selected among the set of the following particulate filters: a Bayesian filter, a Kalman filter, extended Kalman filters.

According to a second embodiment of the invention, constructing said prediction model includes the following steps:
  constructing a linear model for the evolution of the temperature residual margin using the history of said second curve, and
  applying a regression technique to said linear model to determine said at least one failure forecast indicator.

Constructing a linear model is very simple and enables accurate forecasts to be made with very little computation.

Advantageously, said at least one failure forecast indicator is selected among a set of indicators comprising:
  a first indicator for estimating the probability of exceeding a failure threshold before a predetermined time horizon, and
  a second indicator for estimating the date of exceeding a failure threshold.

Advantageously, acquiring said time signal of temperature residual margin includes the following steps:
  acquiring over time measurements of the exhaust gas temperature of the aircraft engine,
  normalizing said temperature measurements relative to an iso standard reference temperature thus forming normalized temperature measurements, standardizing said normalized temperature measurements by taking into account context data thus forming standardized temperature measurements, and computing the margins between said standardized temperature measurements and a predetermined maximum temperature value (as a function of the engine) to form said margin time signal.

Thus, the margin time signal is collected according to standard physical conditions and independently of the context.

The invention also provides a system for monitoring an aircraft engine, including:

acquisition and processing means configured to collect a time signal of the exhaust gas temperature residual margin of said aircraft engine, acquisition and processing means configured to smooth said time signal thus forming a first curve representing said temperature residual margin, acquisition and processing means configured to identify decreasing pieces in said first curve, acquisition and processing means configured to construct a second curve by concatenation of said decreasing pieces, said second curve being continuous while being restricted to said decreasing pieces of said first curve, acquisition and processing means configured to construct a prediction model from said second curve to determine at least one failure forecast indicator.

The invention also relates to a computer program likely to be implemented by processing means and including code instructions adapted to implement the monitoring method according to any of the above characteristics.

BRIEF DESCRIPTION OF THE DRAWINGS

Further features and advantages of the system and the method according to the invention will become more apparent upon reading the following description, by way of indicating but non limiting example, with reference to the accompanying drawings in which.

DETAILED DESCRIPTION OF EMBODIMENTS

The principle of the invention consists in deleting points corresponding to an artificial increase in the temperature residual margin to keep only the decreasing parts representing the real wear of the engine. Thus, by observing the evolution of this wear, it is possible to forecast with a great accuracy the future failure of the engine and the maintenance operations to be conducted.

Figure 1:
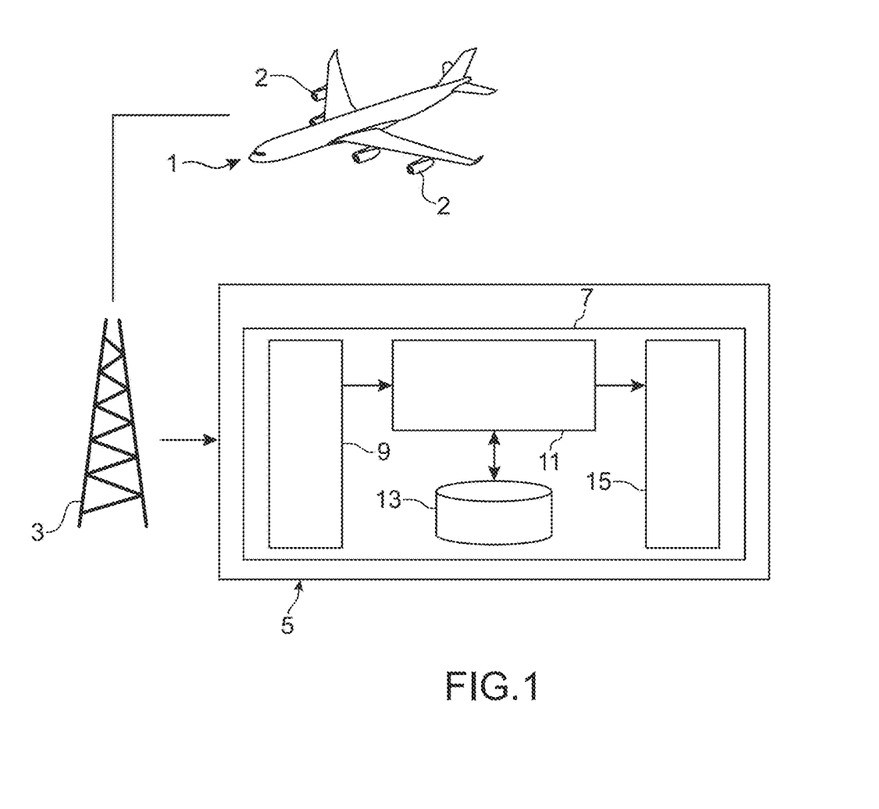
FIG. 1 schematically illustrates material resources implemented in the system or method which can be used for monitoring an aircraft engine according to the invention.

FIG. 1 illustrates an example of material resources implemented in the system or method for monitoring an aircraft engine according to the invention. The present invention can also apply to an aircraft including several engines, such as represented in FIG. 1.

During a flight, an aircraft 1 performs the recording of information regarding its functioning as well as different environmental parameters. These data recorded by computers aboard the aircraft (for example, FADEC, ACMS, etc.) come from measurements supplied by measuring means or sensors integrated into the aircraft 1. For example, the FADEC (which controls the engine 2 of the aircraft 1) records a certain number of data measured by sensors integrated into the engine 2 both for controlling the engine 2 and serving as a basis for a maintenance predictive procedure.

The computers of the aircraft 1 thus collect over time, data related to the aircraft engine 2 and its environment. At each acquisition, these data comprise information related to endogenous parameters describing the behavior of the engine 2 as well as to exogenous parameters describing the acquisition context.

By way of example, the endogenous parameters comprise the exhaust gas temperature EGT, the rotational speeds of the shafts, the fuel flow, the temperatures and pressures of fluids at different locations of the engine (for example, before and/or after compression), etc.

The exogenous parameters can comprise the outside temperature, the altitude, the weight of the plane, the variable geometry of the bleed valve, the set points of the high pressure and low pressure turbines, the speed of the plane, etc.

Furthermore, an aircraft 1 regularly sends to the ground short instant messages regarding the endogenous and exogenous parameters. During each flight, the aircraft 1 generally sends at least two messages to the ground, one during the take-off and the other during the cruise phase. These messages are particularly sent by satellite (ACARS protocol) thanks to a digital data transmission system between the aircraft in flight and the ground (other communication protocols are possible: PCMCIA, 3G, etc.).

The ground stations 3 recover the different messages emitted at different dates for different aircrafts 1 and for different engines 2 and then send them through a communication means to a management center 5. The latter includes a computing system 7 usually comprising input means 9, acquisition and processing means 11, storing means 13, and output means 15. It will be noted that other data recorded during the flight on the on-board computers can also be regularly unloaded to improve the collection of information related to the engines 2.

The different data from the messages directly received from the different aircrafts 1 or those recovered on the ground from the internal memories of the on-board computers, are stored in the storing means 13 to form a database 14 for a whole fleet of engines 2.

The present invention particularly deals with the data related to the exhaust gas output temperature EGT of the engines.

Figure 2A:
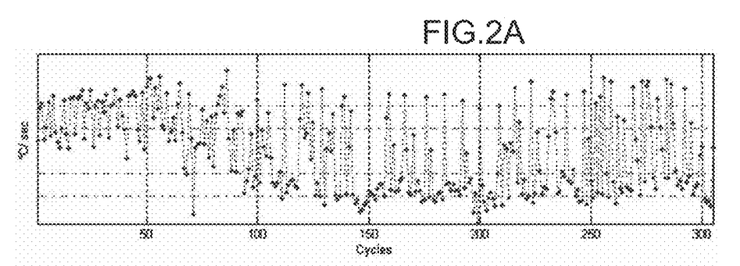
FIG. 2A illustrates the EGT measurements of an aircraft engine during a set of successive flights.

FIG. 2A illustrates the EGT measurements of an aircraft engine during a set of successive flights. The y-axis represents the EGT values and the x-axis the number of cycles or flights.

Certain sensors integrated into the aircraft engine are configured to acquire over time measurements of the exhaust gas output temperature of the engine. The acquisition context of these data can vary a lot. For example, the measurements concerning the takeoff acquired during a first flight of the day when the engine is cold when started can be different from those acquired during the other flights of the day. Other examples concern the variation in the weather conditions (rain, snow, frost, etc.), the change of pilot, the fly-over location (above sea, desert, or land, etc.). Thus, the EGT measurements are very dependent a lot on the outside conditions.

Advantageously, the acquisition and processing means 11 are configured to perform a dual normalization on these EGT measurements relative to a standard frame of reference and relative to the context in order to eliminate the influence of the outside conditions.

More particularly, the temperature (EGT) measurements are normalized relative to an iso standard reference temperature thus forming normalized temperature measurements. The reference temperature is defined relative to a take-off temperature measured at sea level. These normalized temperature measurements are further standardized relative to the context data to form standardized EGT measurements. The standardization technique is for example described in the applicant's patent EP2376988 and is based in particular on a regression model while possibly taking in consideration further parameters constructed from computations using initial exogenous parameters.

Figure 2B:
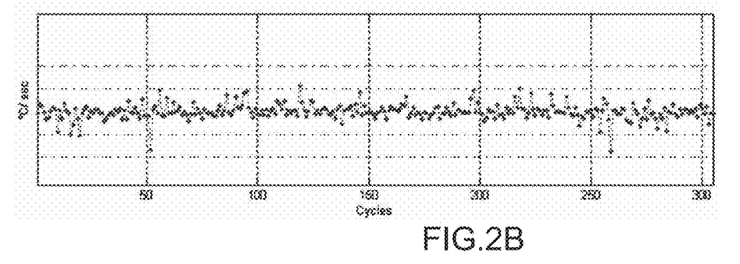
FIG. 2B illustrates the standardized EGT measurements of the aircraft engine during a set of successive flights.

FIG. 2B illustrates the standardized EGT measurements of the aircraft engine during a set of successive flights. The graphic representation of FIG. 2B corresponds to the standardization of the one of FIG. 2A. Both representations have the same scale and are focused on the mean value of the EGT measurements. The horizontal dashed lines represent the bounds ±3σ and ±6σ around the mean value.

Figure 3:
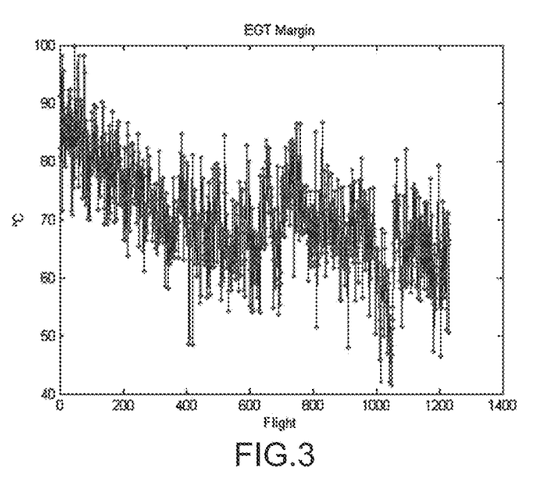
FIG. 3 illustrates the time signal of the exhaust gas temperature residual margin.

Finally, the acquisition and processing means 11 are configured to compute margins between the standardized EGT measurements and a predetermined maximum temperature value to construct the time signal of the exhaust gas temperature residual margin as illustrated in FIG. 3. The maximum temperature generally corresponds to a limit temperature requiring the shop engine removal.

In particular, FIG. 3 shows that the time signal of the temperature residual margin has random oscillations in spite of being based on standardized EGT measurements. These oscillations are essentially due to the different servicing operations (for example, water cleanings) performed on the engine.

Figure 4:
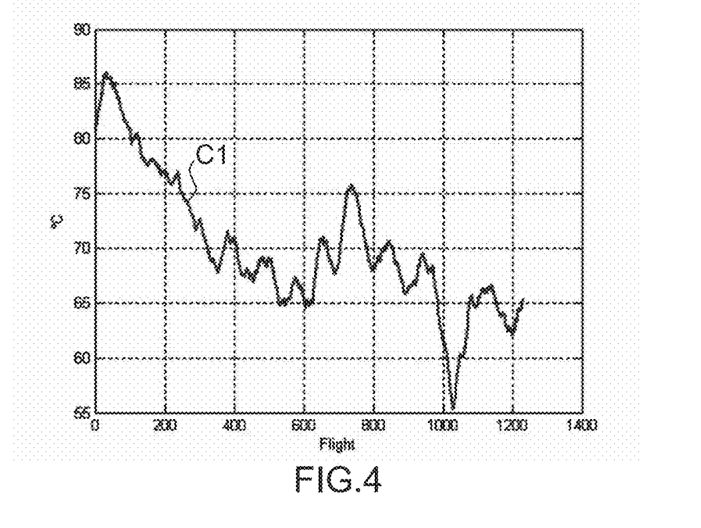
FIG. 4 illustrates a first curve corresponding to the smoothing of the time signal of FIG. 3 over a predetermined period, according to the invention.

The acquisition and processing means 11 are further configured to smooth the time signal of FIG. 3 in order to form a first curve C1 representing the temperature residual margin as illustrated in FIG. 4. Smoothing the time signal can be performed according to a known filtering technique (moving average, Gaussian filter, etc.). The first curve C1 clearly shows raising hops corresponding to artificial increases in the temperature residual margin. These raising hops seem to appear more or less regularly but with different effects.

In accordance with the invention, it is proposed to eliminate the raising hops to keep only the descending parts representing the real wear of the engine.

Thus, the acquisition and processing means 11 are configured to automatically identify the decreasing pieces in the first curve. More particularly, identifying the decreasing pieces can be for example performed by looking for the ascents corresponding to the hops.

According to a preferred embodiment of the invention, the acquisition and processing means 11 apply a statistical model corresponding to a statistical increase process to the first curve C1 to extract the areas devoid of raising hops.

This statistical process can be decomposed into two independent parts so that an increase $dX_t=X_{t+1}-X_t$ of the temperature residual margin related to the first curve C1, is defined by the sum of a first decreasing function $U_t$ and a second step function $H_t$ according to the following equation:

$$dX_t=U_t+H_t$$

The decreasing function $U_t$ represents a usual wear of the aircraft engine and can be considered as a random variable $U_t$ which follows a Gaussian distribution $U_t \sim N(-u,\sigma_u)$ parametered by a negative expectation $-u$ representing the normal decrease of the temperature residual margin and by a standard deviation $\sigma_u$.

The step function $H_t$ represents the servicing operations on the aircraft engine and can be defined by a products $H_t=Z_t G_t$ of a random Boolean distribution $Z_t$ and of a random variable of a positive hop $G_t$.

The random variable of the hop $G_t$ can also be described according to a Gaussian distribution $G_t \sim N(+g,\sigma_g)$ parametered by a positive mean hop $g$ and by a standard deviation $\sigma_g$, the mean hop $g$ being greater than the absolute value $u$ of the normal decline $-u$ of the temperature residual margin.

The boolian law $Z_t$ randomly triggers the hop $G_t$ with a small probability p and can be for example defined by a binomial distribution $Z_t \sim B(p)$ with a predetermined parameter p. Thus, the probability of a servicing operation on the engine (i.e., an ascent) is given by $p=P(Z_t=1)$. Then, to identify the decreasing pieces modeled by the random variable $U_t$, it is sufficient to take the set of instants t where $Z_t=0$ by deleting the points corresponding to the ascents.

Figure 5:
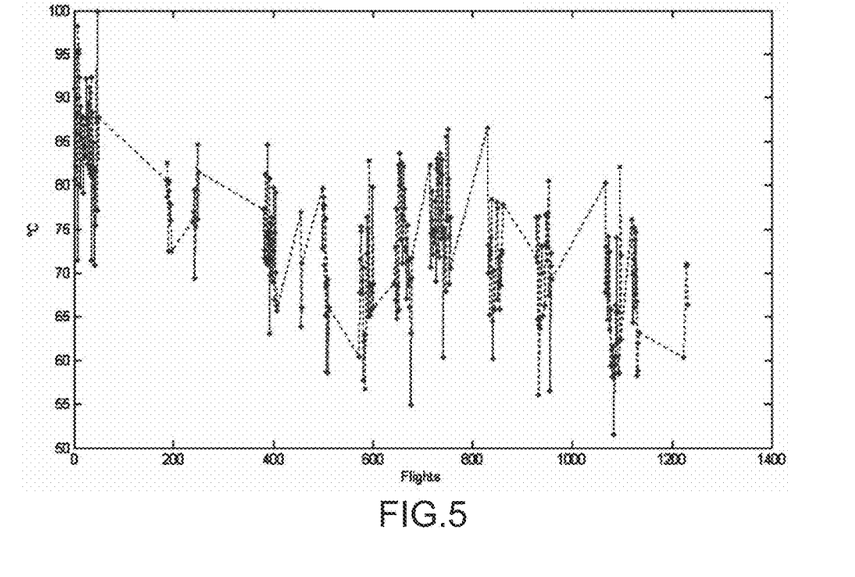
FIG. 5 illustrates a graphic representation of the ascents corresponding to the hops of the first curve, according to the invention.

FIG. 5 illustrates a graphic representation of the ascents corresponding to the hops. This representation shows points localized around discrete instants corresponding to ad hoc actions, separated by long intervals. The discrete instants have artificial thicknesses which are induced by the normalization and smoothing operations. It will be noted that there are far fewer discrete instants than decreased instants and that they can therefore be ignored without any incidence on the value of the parameters Iu and $\sigma_u$ of the Gaussian distribution $U_t \sim N(-u,\sigma_u)$.

Figure 6:
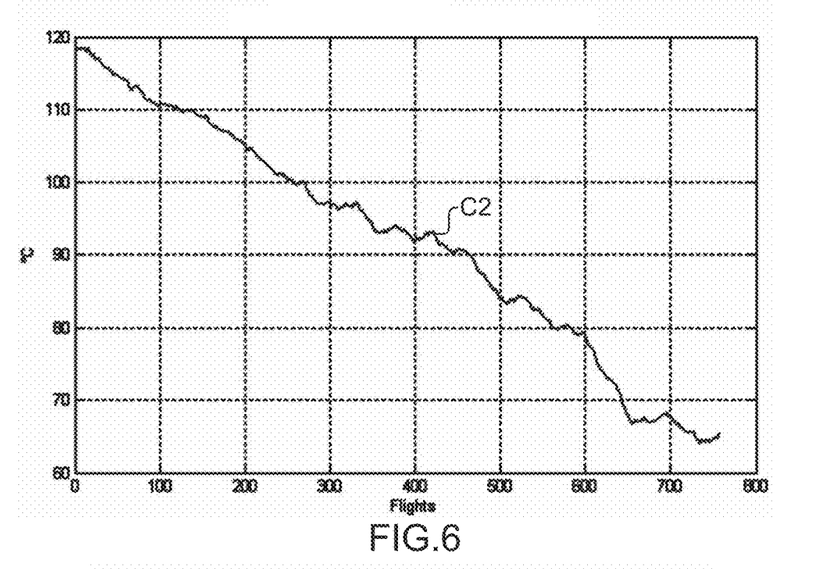
FIG. 6 illustrates a graphic representation of a second curve formed by the concatenation of the decreasing pieces, according to the invention.

Once the ascent discrete instants are deleted, the acquisition and processing means 11 are configured to construct a second curve C2 by concatenation of the decreasing pieces, as illustrated in FIG. 6. The second curve is then continuous and decreasing while being restricted to only the decreasing pieces of the first curve C1.

The construction by concatenation of the second curve C2 consists in displacing vertically and horizontally the decreasing pieces to bond the ends to each other so as to ensure a continuity between the different pieces.

In particular, the acquisition and processing means 11 are configured to start with the last piece (i.e., the most recent piece) so that the last values have a physical sense. Then, the other pieces are concatenated by going back in time step by step. Thus, each previous piece (i.e., anterior) is displaced to make it successively join the following piece in a time reversed direction. In other words, the values of the variations $dX_t = X_{t-1} - X_t$ are gradually added from right to left to form the second curve C2.

Furthermore, the acquisition and processing means 11 are configured to construct from the second curve C2, a failure prediction model enabling at least one failure forecast indicator of the engine to be determined.

It will be noted that the curve illustrated in the example of FIG. 6 is practically linear. Thus, according to a first embodiment, it is advantageous to use the record of the second curve C2 to construct a linear model of the evolution of the temperature residual margin and then to apply to this linear model a quite simple regression technique to determine the failure forecast indicator(s). According to this embodiment, it is not necessary to analyze the dynamics of the signal and it is sufficient to estimate the general trend of the decrease which follows a Student type law.

However, for quite young-aged engines the margin decrease is slow and not strictly linear. Therefore, according to a second embodiment, a stochastic method based on dynamic or particulate filters is used.

Generally speaking, a good way to anticipate a continuous process consists in modeling its behavior with an autoregressive model. Thus, an autoregressive model modeling the evolution of the temperature residual margin is constructed by using the record of the second curve. Therefore, it is possible to extract a process of so-called hidden states $(X_t)_{t>0}$ from the observations $(Y_t)_{t\geq1}$.

In particular, it is assumed that the process of states $(X_t)_{t>0}$ is a one order Markov chain and that the link between $(X_t)_{t>0}$ and $(Y_t)_{t\geq1}$ is governed by a memoryless channel hypothesis. Then, the state space of the autoregressive model can be defined as follows:

$$\begin{cases} X_t = FX_{t-1} + e_t \\ Y_t = HX_{t-1} \end{cases}$$

$e_t$ is a white noise, the operator F is the state transition matrix and the operator H is the observation matrix defining the dynamic system. It will be noted that thanks to the elimination the raising hops, the dynamic system which senses the decrease of the signal of the temperature residual margin is very simple to analyze and to implement and requires very few computation steps while giving highly accurate results.

Then, a dynamic filter is applied to the autoregressive model to recursively estimate the process of hidden states $(X_t)_{t>0}$ from the observations $(Y_t)_{t\geq1}$ according to a Bayesian technique. The dynamic filtering thus enables to determine the hidden state $X_k$ for any instant k from the available observations $Y_1, \ldots, Y_k$ (i.e., until the instant k). Thus, the long term failure forecast indicator(s) can be determined with accuracy.

Figure 7:
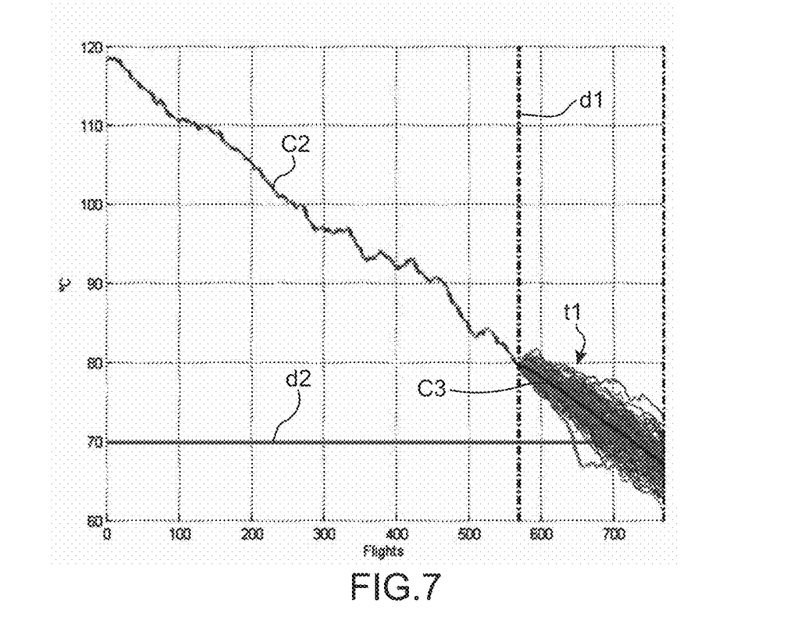
FIG. 7 illustrates the application of a particulate filter to the dynamic system of the second curve, according to the invention.

Indeed, FIG. 7 illustrates the application of a particulate filter to the dynamic system of the second curve.

The curve C2 up to the dashed vertical line d1 corresponds to the observation process $(Y_t)$ representing the observed evolution of the margin. The vertical line d1 thus corresponds to the instant when a prediction is made as a function of the observation process $(Y_t)$. From this instant, the application of the dynamic filter simulates a plurality of particulate paths t1, the bold curve C3 inside the different paths t1 representing the mean path. The horizontal line d2 represents the failure threshold. It is to be noted that the prediction quality is very good thanks to the accurate knowledge of the dynamic system and especially thanks to the elimination of ascents corresponding to the ad hoc servicing operations on the engine.

Figure 8:
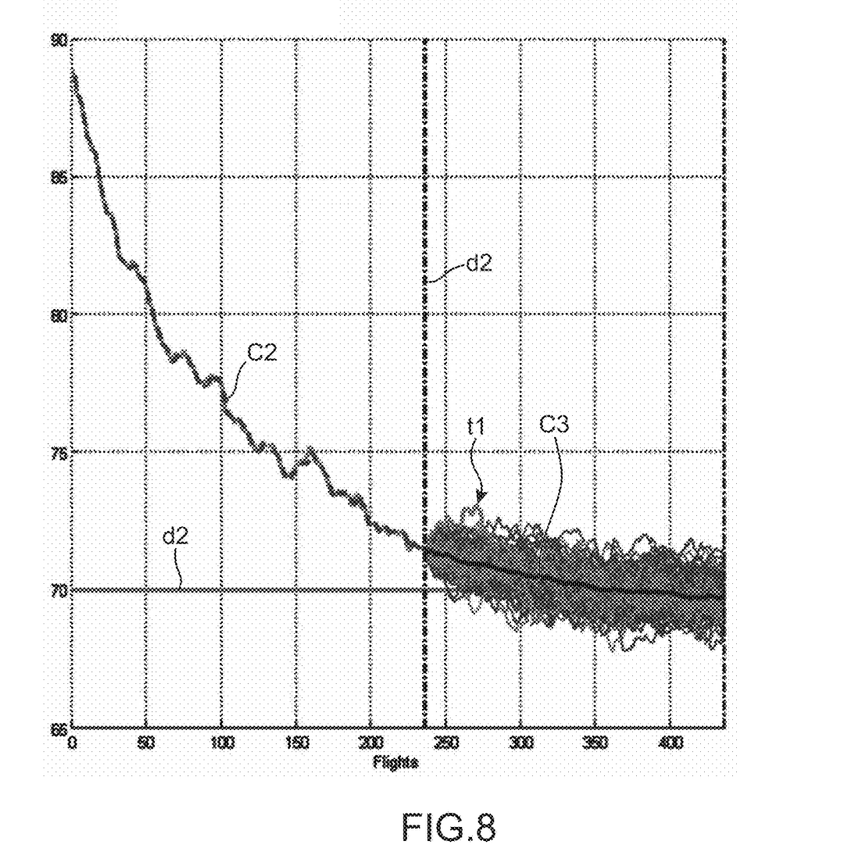
FIG. 8 illustrates the application of a particulate filter to the dynamic system of the second curve related to a young-aged engine, according to the invention.

FIG. 8 illustrates the application of a particulate filter to the dynamic system related to a young-aged engine.

Initially the decrease in the temperature residual margin is quite big due to a run-in phenomenon of the young-aged engine. Then, the evolution smoothes down and the decrease becomes quite slow. In the same way as in FIG. 7, the application of the dynamic filter simulates a plurality of particulate paths with a great prediction quality.

Thus, the use of a particulate filter dynamic model enables to make accurate long-term forecasts for every type of engines and at any age.

It is to be noted that the dynamic filter can be a linear or non-linear Bayesian filter. Alternatively, a Kalman filter or a Kalman filter extension (for example, an extended Kalman filter) can be used.

Any application of one of these dynamic filters to the prediction model enables the evolution of the temperature residual margin to be estimated, and consequently failure forecast indicators which can be used as warning indicators to be determined.

Figure 9:
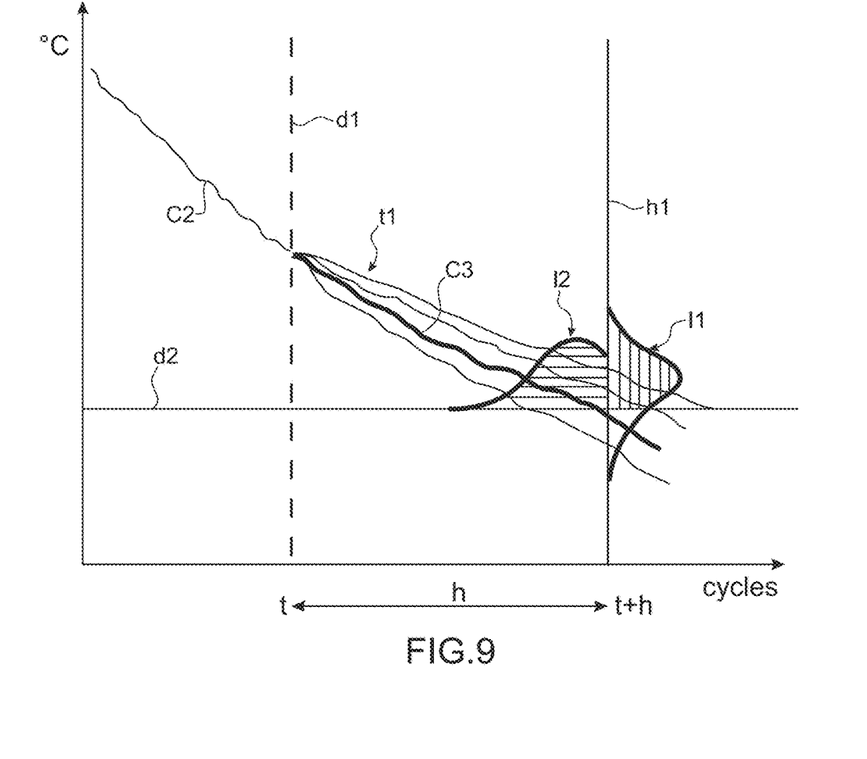
FIG. 9 schematically illustrates two failure forecast indicators, according to the invention.

FIG. 9 schematically illustrates two failure forecast indicators according to the invention.

The first indicator I1 estimates the probability of exceeding the failure threshold d2 before a predetermined time horizon h1. This is schematized by the computation of a probability of detection POD at the instant t+h. By way of example, the time horizon h1 can correspond to a date scheduled for inspecting the engine.

Alternatively, one can reason in terms of estimating the Remaining Useful Life RUL of the engine. In this case, the second indicator estimates the date of exceeding the failure threshold d2.

Thus, these failure forecast indicators I1, I2 make it possible to predict the probability of failure once a future horizon h1 is reached, or to predict the failure date.

The invention also provides a computer program, likely to be implemented in the processing means and including code instructions adapted to implement a method according to the above-described invention.

What is claimed is:

1. A method for monitoring an aircraft engine, including the following steps of:
   acquiring a time signal of the exhaust gas temperature residual margin of said aircraft engine (2),
   smoothing said time signal to form a first curve (C1) representing said temperature residual margin,
   identifying decreasing pieces in said first curve,
   constructing a second curve (C2) by concatenation of said decreasing pieces, said second curve being continuous while being restricted to said decreasing pieces of said first curve, and
   constructing a prediction model from said second curve to determine at least one failure forecast indicator (I1, I2).

2. The method according to claim 1, wherein identifying the decreasing pieces in said first curve includes the following steps of:
   applying to the first curve (C1) a statistical increase model decomposable into two independent parts formed of a first decreasing function representing a usual wear of the aircraft engine and of a second step function formed of randomly triggered hops representing ad hoc servicing operations on the aircraft engine,
   looking for ascents corresponding to said hops, and
   identifying the decreasing pieces by deleting the points from said ascents on the first curve.

3. The method according to claim 1, wherein constructing by concatenation said second curve (C2) includes a bonding of said decreasing pieces by displacing each previous piece, to make it join the following piece starting by the last piece and going back in time step by step.

4. The method according to claim 1, wherein constructing said prediction model includes the following steps of:
constructing an autoregressive model modeling the evolution of the temperature residual margin using the record of said second curve, and
applying a dynamic filter to said autoregressive model to determine said at least one failure forecast indicator.

5. The method according to claim 4, wherein the dynamic filter is selected among the set of the following particulate filters: a Bayesian filter, a Kalman filter, extended Kalman filters.

6. The method according to claim 1, wherein constructing said prediction model includes the following steps:
constructing a linear model for the evolution of the temperature residual margin using the record of said second curve, and
applying a regression technique to said linear model to determine said at least one failure forecast indicator.

7. The method according to claim 1, wherein said at least one failure forecast indicator is selected among a set of indicators comprising:
a first indicator (I1) for estimating the probability of exceeding a failure threshold before a predetermined time horizon, and
a second indicator (I2) for estimating the date of exceeding a failure threshold.

8. The method according to claim 1, wherein acquiring said time signal of the temperature residual margin includes the following steps of :
acquiring over time measurements of the exhaust gas temperature of the aircraft engine,
normalizing said temperature measurements relative to a standard reference temperature thus forming normalized temperature measurements,
standardizing said normalized temperature measurements by taking into account context data thus forming standardized temperature measurements, and
computing the margins between said standardized temperature measurements and a predetermined maximum temperature value (as a function of the engine) to form said margin time signal.

9. A system for monitoring an aircraft engine, including:
acquisition and processing means (11) configured to collect a time signal of the exhaust gas temperature residual margin of said aircraft engine (2),
acquisition and processing means (11) configured to smooth said time signal thus forming a first curve (C1) representing said temperature residual margin,
acquisition and processing means (11) configured to identify decreasing pieces in said first curve,
acquisition and processing means (11) configured to construct a second curve (C2) by concatenation of said decreasing pieces, said second curve being continuous while being restricted to said decreasing pieces of said first curve,
acquisition and processing means (11) configured to construct a prediction model from said second curve to determine at least one failure forecast indicator (I1, I2).

10. A non-transitory computer-readable medium having instructions stored thereon that, when executed by a computer, cause the computer to perform the monitoring method according to claim 1.

* * * * *